United States Patent [19]

Isaji et al.

[11] Patent Number: 5,157,956
[45] Date of Patent: Oct. 27, 1992

[54] METHOD OF CALIBRATING A THROTTLE ANGLE SENSOR

[75] Inventors: Norifumi Isaji; Shinji Ohashi, both of Kanagawa, Japan

[73] Assignee: Nissan Motor Company, Limited, Yokohama, Japan

[21] Appl. No.: 854,766

[22] Filed: Mar. 20, 1992

Related U.S. Application Data

[63] Continuation of Ser. No. 723,684, Jun. 24, 1991, abandoned, which is a continuation of Ser. No. 384,691, Jul. 25, 1989, abandoned.

[30] Foreign Application Priority Data

Jul. 25, 1988 [JP] Japan ............... 63-98307[U]
Jul. 25, 1988 [JP] Japan ............... 63-98309[U]

[51] Int. Cl.⁵ .......................................... G01M 19/00
[52] U.S. Cl. ......................................... 73/1 D; 73/118.1
[58] Field of Search ............. 180/76, 178, 197, 279;
123/361, 396, 399, 336, 403; 73/118.1, 1 D

[56] References Cited

U.S. PATENT DOCUMENTS

| 4,513,782 | 4/1985 | Contartese et al. | 137/625.63 |
| 4,622,936 | 11/1986 | Junginger et al. | 123/399 |
| 4,625,697 | 12/1986 | Hosaka | 123/478 |
| 4,630,578 | 12/1986 | Nusser et al | 123/179 G |
| 4,640,395 | 2/1987 | Murasugi et al. | 192/3.31 |
| 4,722,411 | 2/1988 | Ohashi et al. | 180/197 |
| 4,763,912 | 8/1988 | Matsuda | 180/197 |

FOREIGN PATENT DOCUMENTS

| 0027865 | 5/1981 | European Pat. Off. . |
| 0075507 | 3/1983 | European Pat. Off. . |
| 0171641 | 2/1986 | European Pat. Off. . |
| 0254942 | 2/1988 | European Pat. Off. . |
| 1499985 | 2/1978 | United Kingdom . |
| 1556022 | 11/1979 | United Kingdom . |
| 1556696 | 11/1979 | United Kingdom . |
| 2132032 | 6/1984 | United Kingdom . |
| 2138969 | 10/1984 | United Kingdom . |

Primary Examiner—Jerry W. Myracle
Attorney, Agent, or Firm—Foley & Lardner

[57] ABSTRACT

A throttle control system takes a strategy of sampling sensor signal values representative of maximum open angle position (fully open position) and minimum open angle position (near fully closed position) upon starting-up of the engine in response to turning ON of an ignition switch as a primary power switch. The sampled throttle angle indicative sensor signals respectively representative of the maximum throttle valve open angle and the minimum throttle valve open angle are stored as "secondary throttle fully open position indicative reference value" and as "secondary throttle fully closed position indicative reference value". Based on these stored values, correction factor for correcting a sensor signal value of a throttle angle sensor monitoring the angular position of the secondary throttle valve is derived. The correction factor is used throughout the engine operation for correcting a secondary throttle open angle indicative sensor signal value according to a predetermined characteristics. The throttle control system may also control an open angle at a fully closed position of a primary throttle valve adjusted in accordance with the engine temperature condition. Based on this, the secondary throttle valve open angle is determined so that the open angle of the secondary throttle valve at the minimum open angle position may not be smaller than the derived minimum open angle of the secondary throttle valve so as to prevent the engine from falling into engine stalling state even at cold engine condition.

1 Claim, 9 Drawing Sheets

METHOD OF CALIBRATING A THROTTLE ANGLE SENSOR

This application is a continuation of application Ser. No. 07/723,684, filed Jun. 24, 1991, now abandoned, which is a continuation of application Ser. No. 07/384,691, filed Jul. 25, 1989, now abandoned.

BACKGROUND OF THE INVENTION

1. Field of the Invention

The present invention relates generally to a throttle control system for an automotive internal combustion engine for controlling a throttle valve angular position in order to adjust an engine output torque for suppressing wheel slippage and for better tread/road traction. More specifically, the invention relates to a throttle control system of a tandem throttle type air induction system of the internal combustion engine, which has a pair of throttle valves arranged in an air induction passage in tandem fashion.

2. Description of the Background Art

In the recent years, there have been proposed various traction control systems for adjusting driving torque to be transferred to driving wheels of automotive vehicles so as to minimize wheel slippage and obtain maximized or optimal driving performance as well as driving stability.

Among variations in the recently proposed traction control systems, some systems have tandem throttle layout for arranging pair of throttle valves in tandem fashion. One of the throttle valves in such type of throttle valve layout, which serves as a primary throttle valve, is associated with an accelerator, such as an accelerator pedal, so that it may vary open angle according to operational magnitude of the accelerator. The other throttle valve which serves as a secondary throttle valve, is associated with a traction control actuator so that the open angle of the secondary throttle valve can be controlled for adjusting the engine output in the wheel slippage suppressive purpose.

In such type of the traction control system, it is essential to obtain information concerning the angular position of the secondary throttle valve with high accuracy so as to achieve high precision in traction control. Namely, due to tolerance in production of the throttle valve or error in assembling, there may be contained a certain magnitude of error in a signal representative of the angular position of the secondary throttle valve. Such error contained in the secondary throttle angle indicative signal will affect for precision level of traction control.

Furthermore, in the prior proposed traction control systems, the secondary throttle valve is placed at minimum open angle position close to fully closed position when wheel slippage is substantial or when the road friction is substantially low. At such secondary throttle valve condition, the amount of intake air to be introduced into the combustion chamber of the engine becomes minimum. If the minimum intake air amount is determined in view of the normal engine temperature condition, possibility of engine stalling during cold engine state becomes substantially high. On the other hand, when the minimum intake air flow amount is set in view of the cold engine state, reduction of the engine output at normal engine temperature condition becomes too small to effectively recover tread/road traction.

SUMMARY OF THE INVENTION

Accordingly, it is one object of the present invention to provide a throttle control system which can obtain accurate secondary throttle valve open angle data for achieving high precision level in traction control.

Another object of the invention is to provide a throttle control system which is successful in preventing the engine from falling into engine stalling irrespective of the engine temperature condition and without causing degradation of traction control performance.

In order to achieve the first object, a throttle control system, according to the present invention, takes a strategy of sampling sensor signal values representative of maximum open angle position (fully open position) and minimum open angle position (near fully closed position) upon starting-up of the engine in response to turning ON of an ignition switch as a primary power switch. The sampled throttle angle indicative sensor signals respectively representative of the maximum throttle valve open angle and the minimum throttle valve open angle are stored as "secondary throttle fully open position indicative reference value" and as "secondary throttle fully closed position indicative reference value". Based on these stored values, correction factor for correcting a sensor signal value of a throttle angle sensor monitoring the angular position of the secondary throttle valve is derived. The correction factor is used throughout the engine operation for correcting a secondary throttle open angle indicative sensor signal value according to predetermined characteristics.

In order to achieve another and secondary object, the throttle control system, according to the present invention, an open angle at a fully closed position of a primary throttle valve is adjusted in accordance with the engine temperature condition. Based on this, the secondary throttle valve open angle is determined so that the open angle of the secondary throttle valve at the minimum open angle position may not be smaller than the derived minimum open angle of the secondary throttle valve so as to prevent the engine from falling into engine stalling state even at cold engine condition.

According to one aspect of the invention, a throttle control system for an internal combustion engine of an automotive vehicle, comprises:

a first throttle valve disposed within an air induction passage and variable of angular position according to operation magnitude of a manually operable accelerator;

a second throttle valve disposed within the air induction passage in tandem fashion with the first throttle valve and variable of angular position between a first angular position at which a maximum intake air flow path area is provided and a second angular position at which minimum intake air flow path area is provided;

a second throttle angle sensor for monitoring angular position of the second throttle valve to produce a second throttle position indicative signal;

an electrically operable actuator means, associated with the second throttle valve for driving the second throttle valve to cause angular displacement to a desired angular position;

a vehicle driving condition monitoring means for monitoring vehicular driving condition including wheel slippage and producing a vehicle driving condition indicative signal;

a controller means receiving the vehicle driving condition indicative signal for deriving the desired angular position based thereon, and feedback controlling the actuator means based on the desired angular position and the second throttle position indicative signal so that the second throttle valve is placed at the desired angular position, the controller means being responsive to ON-set of power supply thereto to sample the second throttle position indicative signal value as first reference value, driving the second throttle valve to the second position and sampling the second throttle position indicative signal value when the second throttle valve is held at the second position as a second reference data in order to derive variation characteristics of the second throttle angle indicative signal according to angular displacement of the second throttle valve, which characteristics is used for detecting the second throttle valve angular position on the basis of the second throttle position indicative signal.

In the preferred construction, the controller means monitors the second throttle position indicative signal value while the second throttle valve is driven to the second position for sampling the second reference data and detects the second throttle valve at the fully closed position when the second throttle position indicative signal value is held unchanged for a predetermined period despite of operation of the actuator means. The controller means may update the characteristics at every occurrence of ON-set of power supply.

According to another aspect of the invention, in a throttle control system for an internal combustion engine of an automotive vehicle, including:

a first throttle valve disposed within an air induction passage and variable of angular position according to operation magnitude of a manually operable accelerator;

a second throttle valve disposed within the air induction passage in tandem fashion with the first throttle valve and variable of angular position between a first angular position at which a maximum intake air flow path area is provided and a second angular position at which minimum intake air flow path area is provided;

a second throttle angle sensor for monitoring angular position of the second throttle valve to produce a second throttle position indicative signal;

an electrically operable actuator means, associated with the second throttle valve for driving the second throttle valve to cause angular displacement to a desired angular position;

a vehicle driving condition monitoring means for monitoring vehicular driving condition including wheel slippage and producing a vehicle driving condition indicative signal;

a controller means receiving the vehicle driving condition indicative signal for deriving the desired angular position based thereon, and feedback controlling the actuator means based on the desired angular position and the second throttle position indicative signal so that the second throttle valve is placed at the desired angular position, an arrangement for deriving the angular position of the second throttle valve, comprising:

means responsive to ON-set of power supply thereto for sampling the second throttle position indicative signal value as first reference data;

means for continuously actuating the actuator for driving the second throttle valve to the second position means for sampling the second throttle position indicative signal value when the second throttle valve is held at the second position as a second reference data;

means for deriving variation characteristics of the second throttle angle indicative signal according to angular displacement of the second throttle valve on the basis of the first and second reference data; and means for deriving the second throttle valve angular position utilizing the variation characteristics and the first reference data.

According to a further aspect of the invention, in a throttle control system for an internal combustion engine of an automotive vehicle, including a throttle valve, a throttle angle sensor for monitoring angular position of the throttle valve to produce a throttle position indicative signal, an electrically operable actuator means, associated with the throttle valve for driving the throttle valve to cause angular displacement to a desired angular position;

an arrangement for deriving the angular position of the throttle valve, comprising:

means responsive to ON-set of power supply thereto for sampling the throttle position indicative signal value as first reference data;

means for continuously actuating the actuator for driving the second throttle valve to the second position means for sampling the throttle position indicative signal value when the throttle valve is held at the second position as a second reference data;

means for deriving variation characteristics of the throttle angle indicative signal according to angular displacement of the throttle valve on the basis of the first and second reference data; and means for deriving the throttle valve angular position utilizing the variation characteristics and the first reference data.

According to a still further aspect of the invention, a throttle control system for an internal combustion engine of an automotive vehicle, comprises:

a first throttle valve disposed within an air induction passage and variable of angular position according to operation magnitude of a manually operable accelerator;

an engine coolant temperature responsive means for defining a minimum open angle of the first throttle valve, which minimum open angle varies to increase according to lowering of the engine coolant temperature and decrease according to rising of the engine coolant temperature;

a second throttle valve disposed within the air induction passage in tandem fashion with the first throttle valve and variable of angular position between a first angular position at which a maximum intake air flow path area is provided and a second angular position at which minimum intake air flow path area is provided;

a second throttle angle sensor for monitoring angular position of the second throttle valve to produce a second throttle position indicative signal;

an electrically operable actuator means, associated with the second throttle valve for driving the second throttle valve to cause angular displacement to a desired angular position;

a vehicle driving condition monitoring means for monitoring vehicular driving condition including wheel slippage and producing a vehicle driving condition indicative signal;

a controller means receiving the vehicle driving condition indicative signal for deriving the desired angular position based thereon, and feedback controlling the actuator means based on the desired angular position and the second throttle position indicative signal so that the second throttle valve is placed at the desired angular position, the controller means setting the second position of the second throttle valve at an open angular position greater than or equal to the minimum open angle of the first throttle valve.

The engine coolant temperature dependent means may comprise a stopper member restricting angular displacement of the first throttle valve in a direction of fully closed position. The throttle control system may further comprise a first throttle angle sensor monitoring angular position of the first throttle valve to produce a first throttle position indicative signal, and the controller means detects the first throttle valve at a fully closed position leaving the minimum open angle for setting the minimum open angle at the second position of the second throttle valve at the corresponding open angle to the minimum open angle of the first throttle valve.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
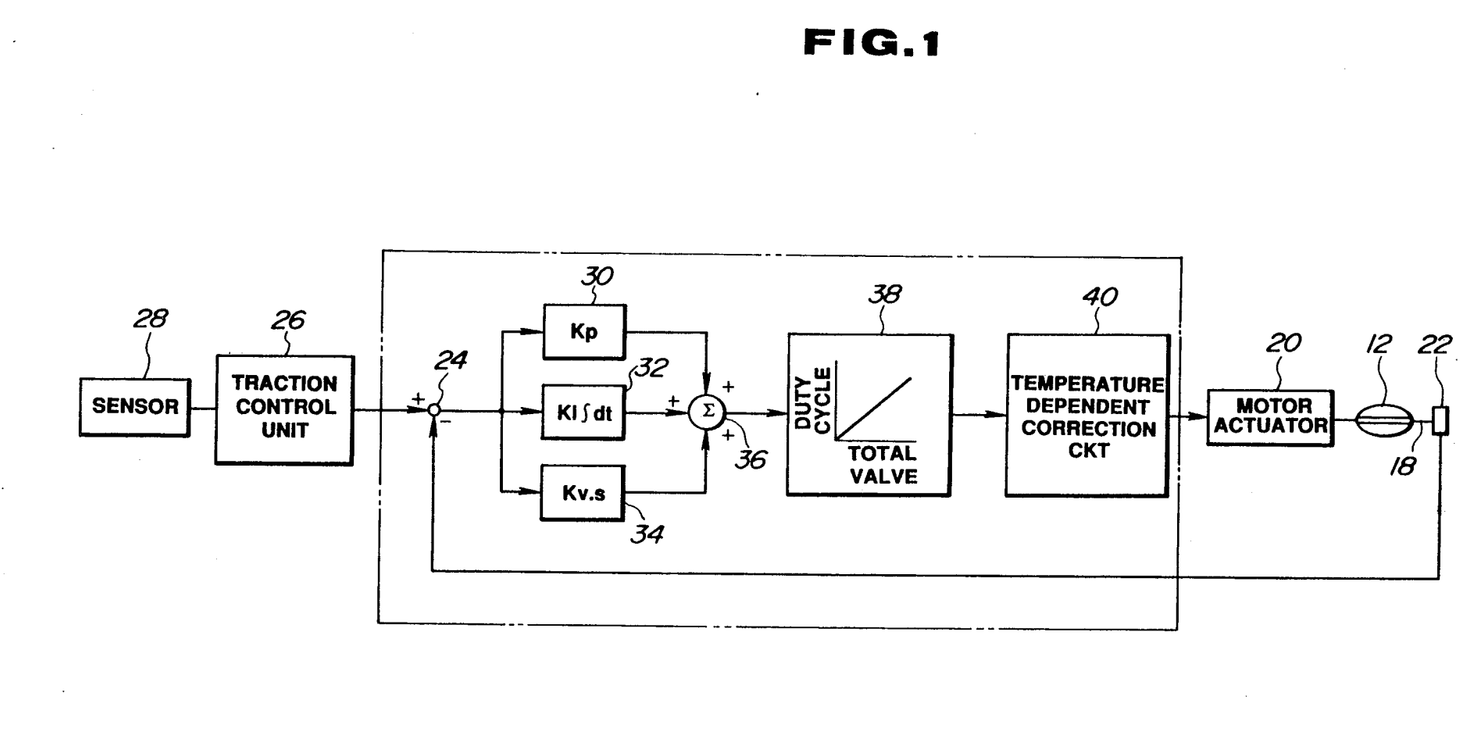
FIG. 1 is a schematic block diagram of a traction control system for which the preferred embodiments of throttle control system according to the present invention is applicable.
Figure 2:
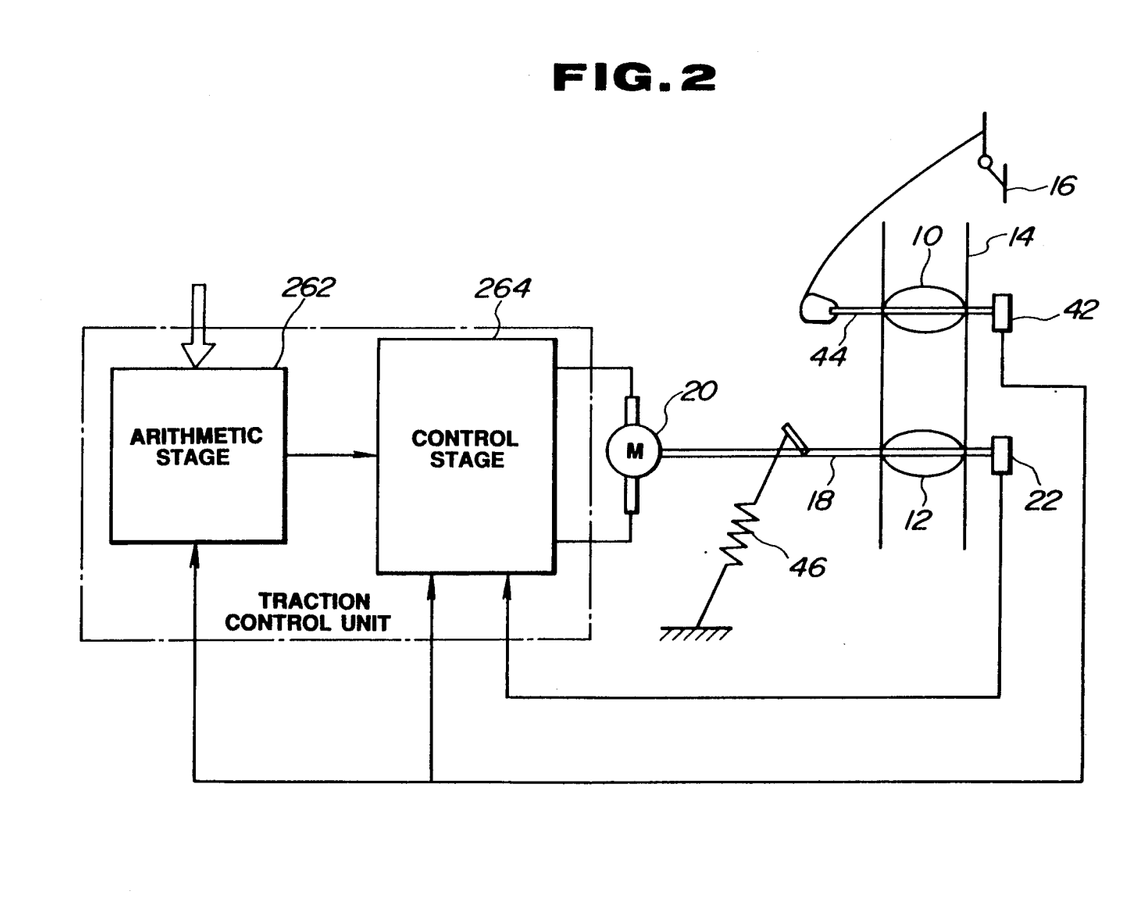
FIG. 2 is a diagrammatical illustration of the first embodiment of the throttle control system according to the invention.

Referring now to the drawings, particularly to FIGS. 1 and 2, a traction control system, to which the preferred embodiments of a throttle control system according to the present invention is applicable will be briefly discussed in order to facilitate better understanding of the invention. The shown traction control system is applied for an internal combustion engine having a tandem throttle type air induction system. The tandem throttle type air induction system includes a primary throttle valve 10 and a secondary throttle valve 12 arranged in an air induction passage 14 in tandem fashion, as shown in FIG. 2. The primary throttle valve 10 is mechanically connected to an accelerator pedal 16 via a known accelerator linkage 18. In the alternative, the primary throttle valve 10 may be coupled with a throttle actuator which may comprise a stepping motor and forms a throttle servo mechanism, so that the primary throttle valve may be placed at a desired angular position by means of the throttle actuator according to a command indicative electric signal generated by an accelerator position sensor.

As shown in FIGS. 1 and 2, the secondary throttle valve 12 has a valve shaft 18 rotatably supported in the peripheral wall of a throttle chamber of the air induction passage 14. The valve shaft 18 is associated with a motor actuator 20 so as to be driven by the driving torque of the motor actuator for causing angular displacement of the throttle valve 12. The valve shaft 18 is also coupled with a secondary throttle position sensor 22 for monitoring angular position of the valve shaft and whereby monitoring angular position of the secondary throttle valve. The secondary throttle position sensor 22 is connected to a subtractor 24 to output a secondary throttle position indicative signal representative of the instantaneous secondary throttle valve angular position. The subtractor 24 is also connected to a traction control unit 26 which receives information representative of rotation speed of a driving wheel and information representative of a vehicular body speed from sensors 28. Practically, the driven wheel speed representative value may be used as the vehicular body speed representative information. The traction control unit 26 derives a magnitude of wheel slippage on the basis of the driving wheel speed representative value and the vehicular body speed representative value and derives a traction control signal for suppressing wheel slippage and representative of a target secondary throttle angular position. The subtractor 24 receives the traction control unit 26 at its positive input and the secondary throttle position indicative signal at its negative input for producing a difference indicative signal.

The difference indicative signal of the subtractor 24 is provided to gain circuits 30, 32 and 34. The gain circuit 30 has a proportional gain Kp for multiplying the difference indicative signal with the proportional gain. The gain circuit 32 integrates the difference indicative signal to derive an integrated value $\int dt$ and multiplies the integrated value with an integral gain $K_1$. The gain circuit 34 differentiates the difference indicative signal to derive a differentiated value s and multiplies the differentiated value by a differentiation gain $K_v$. The gain circuits 30, 32 and 34 are connected to an adder 36. The adder 36 adds the outputs of the gain circuits 30, 32 and 34 to derive a total value thereof. The total value is converted into duty cycle for driving the motor actuator 20 by a duty cycle generator circuit 38. As shown in FIG. 1, the duty cycle generator circuit 38 is set duty cycle in relation to the total value input from the adder 36 in a form of table or map. Therefore, table or map look-up is performed in terms of the input total value for deriving the duty cycle. Duty cycle thus derived in the duty cycle generator circuit 38 is corrected by a temperature dependent correction circuit 40 so as to compensate temperature dependent fluctuation of the motor actuator characteristics which is variable depending upon temperature. The corrected duty cycle output from the temperature dependent correction circuit 40 is supplied to the motor actuator 20. The motor actuator 20 is responsive to the pulse-width modulated (PWM) signal applied thereto and representative of the derived throttle open angle variation for driving the secondary throttle valve at a desired angular position.

As shown in FIG. 2, a primary throttle angle sensor 42 is attached to the valve shaft 44 of the primary throttle valve 10 for monitoring the angular position thereof and for producing a primary throttle angle indicative signal. In general, the primary throttle angle indicative signal also represents magnitude of depression of the accelerator pedal 16. The valve shaft 18 of the secondary throttle valve 12 is associated with a return spring 46 so that the return spring 46 may rotatingly bias the valve shaft 18 with the secondary throttle valve 12 toward an initial and fully open position. Therefore, when the motor actuator 20 is not active and therefore no rotational torque is applied to the valve shaft 18, the valve shaft with the secondary throttle valve 12 is placed at the fully open position.

The traction control unit 26 comprises an arithmetic stage 262 and a control stage 264. The arithmetic stage 262 is connected to the sensors 28 to receive various traction control parameters including the driving wheel speed indicative data and the vehicular body speed representative data. The arithmetic stage 262 also receives the primary throttle angle indicative signal from the primary throttle angle sensor 42. As set forth, the arithmetic stage 262 arithmetically derives the magnitude of wheel slippage generally on the basis of a difference between the driving wheel speed indicative signal value and the vehicular body speed indicative signal value. The arithmetic stage 262 further operates to arithmetically derive a secondary throttle valve open angle on the basis of the derived wheel slippage magnitude in order to suppress the wheel slippage. The arithmetic stage 262 then outputs a secondary throttle valve control signal indicative of the derived secondary throttle valve angular position in order to adjust the engine output torque.

The control stage 264 receives the secondary throttle valve control signal from the arithmetic stage 262 for controlling driving magnitude and direction of the motor actuator 20 which may comprise a stepping motor. The control stage 264 also receives the secondary throttle position indicative signal from the secondary throttle angle sensor 22 as a feedback signal. The control stage 264 derives a difference between the secondary throttle control signal value and the secondary throttle position indicative signal so as to control the motor actuator for driving the secondary throttle valve to reduce the difference to zero. For this purpose, the control stage 264 outputs a motor driving direction indicative signal variable of polarity between HIGH and LOW polarities. HIGH polarity motor driving direction indicative signal represents forward driving direction for driving the secondary throttle valve 12 toward fully closed position. Here, the word "fully closed position" is used to represent the secondary throttle valve angular position with leaving a minimal open area or open angle. Therefore, in understanding of the invention, the word "fully closed position" has to be read as a minimum secondary throttle valve open angle position in the vicinity of the completely closed position. On the other hand, LOW polarity motor driving direction indicative signal represents reverse direction for causing angular displacement of the secondary throttle valve in the initial and fully open position. The control stage 264 further produces ON/OFF signal form driving pulse having a pulse width defining magnitude of driving of the motor actuator 20 thus representative of magnitude of angular displacement of the throttle valve.

Figure 3:
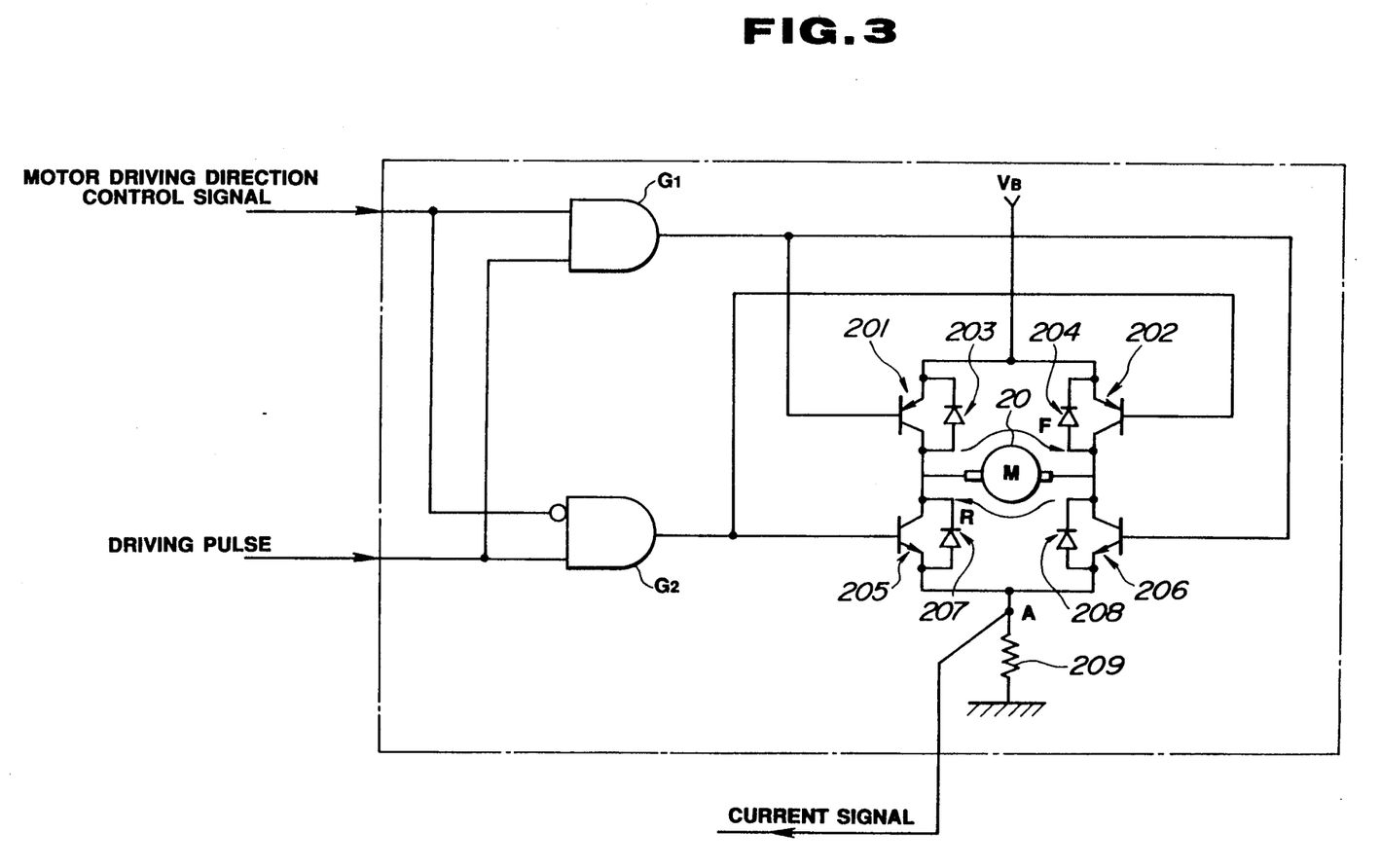
FIG. 3 is a circuit diagram of a motor actuator driving circuit employed in the first embodiment of the throttle control system of FIG. 2.

FIG. 3 shows a motor driving circuit incorporated in the motor actuator 20. The motor driving circuit includes AND gates $G_1$ and $G_2$. The AND gates $G_1$ and $G_2$ are connected to the control stage 264. The AND gate $G_1$ has one terminal for receiving the motor driving direction indicative signal and the other terminal for receiving the driving pulse. On the other hand, the AND gate $G_2$ have inverting input terminals for receiving the motor driving direction indicative signal and the other terminal for receiving the driving pulse. With the shown connection, the AND gate $G_1$ outputs HIGH level gate signal when the motor driving direction indicative signal is HIGH and the driving pulse is maintained at HIGH level. On the other hand, when the motor driving direction indicative signal is LOW and the driving pulse is maintained HIGH level, the AND gate $G_2$ outputs HIGH level gate signal.

The output of the AND gate $G_1$ is connected to a pair of switching transistors 201 and 202 with flywheel diodes 203 and 204 for turning the transistor conductive by HIGH level gate signal. Similarly, the output of the AND gate $G_2$ is connected to a pair of switching transistors 205 and 206 with flywheel diodes 207 and 208 so that the transistors are turned ON in response to HIGH level gate signal therefrom. A current detector resistor 209 is provided in the motor driving circuit in series to the ground.

When the HIGH level gate signal of the AND gate $G_1$ is provided for the switching transistors 201 and 202, the power source voltage of the power source $V_B$ flows in a direction F as indicated in FIG. 3. At this time, since the input level at the inverting terminal of the AND gate $G_2$ is held LOW, the switching transistors 205 and 206 are held OFF. On the other hand, when the HIGH level gate signal of the AND gate $G_2$ is provided for the switching transistors 205 and 206, the power source voltage $V_B$ flows in a direction R as indicated in FIG. 3. At this time, since the input level at the terminal of the AND gate $G_1$ is held LOW, the switching transistors 201 and 202 are held OFF. Therefore, according to the motor driving direction control signal and the driving pulse, the stepping motor in the motor actuator 20 can be driven to place the secondary throttle valve 12 at the angular position derived by the traction control unit 26.

Figure 4:
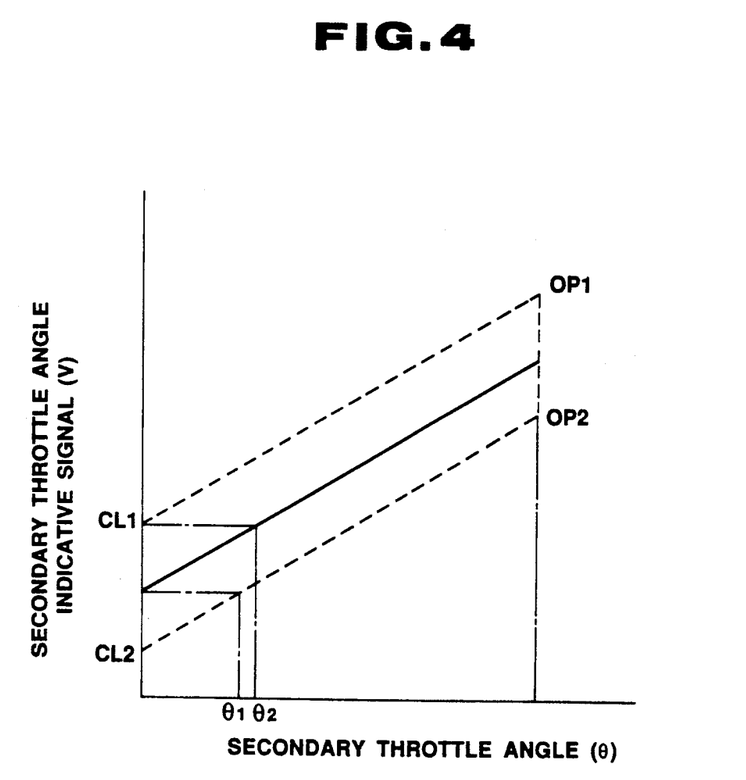
FIG. 4 is a chart showing relationship between a secondary throttle valve open angle indicative sensor signal and an actual open angle of a secondary throttle valve.

FIG. 4 shows relationship between the secondary throttle position indicative signal level (v) of the secondary throttle angle sensor 22 and the actual angular position $\theta$ of the secondary throttle valve 12. In FIG. 4, the solid line shows the designed or target sensor output characteristics relative to variation of the actual secondary throttle valve angular position $\theta$. However, in practice, due to tolerance in production and installation of the secondary throttle angle sensor 22, it may tolerate in a range defined by broken lines $CL_1$-$OP_1$ and $CL_2$-$OP_2$. Therefore, when the practically used secondary throttle angle sensor 22 has the output characteristics as shown by the line $CL_2$-$OP_2$, the secondary throttle position indicative signal value V becomes to indicate the fully closed position of the designed or target characteristics, at the actual secondary throttle valve angular position $\theta_1$. Therefore, if the traction control is performed utilizing such secondary throttle angle sensor and reference characteristics set according to the standard or designed output characteristics, the secondary throttle valve open angle cannot be reduced beyond the angular position $\theta_1$. This may clearly delay recovery of the tread/road traction and thus degrade performance of the traction control. Similarly, when the sensor output characteristics is as illustrated by the line $CL_1-OP_1$, the maximum secondary throttle open angle will become smaller than that can be for causing interference of air induction for cause degradation of the engine acceleration characteristics.

In addition, again, in case of the sensor characteristics as illustrated by the line $CL_1-OP_1$, the secondary throttle angle indicative signal V corresponding to the actual secondary throttle angle $\theta_2$ may be output at the fully closed position the secondary throttle valve. As a result, even after the secondary throttle valve reaches the fully closed position, the motor actuator 20 tends to continue driving to cause overloading to be damaged.

In order to avoid the aforementioned problem created by fluctuation of the sensor output characteristics, the shown embodiment takes a strategy of correcting the sensor output characteristics set in the traction control unit upon ON-set of power supply. The process of correcting setting of the secondary throttle valve angular position table in the traction control unit to be performed during initialization of a traction control program in response to ON-set of power supply, i.e. upon turning ON of an ignition switch, will be discussed herebelow with reference to FIG. 5.

Figure 5:
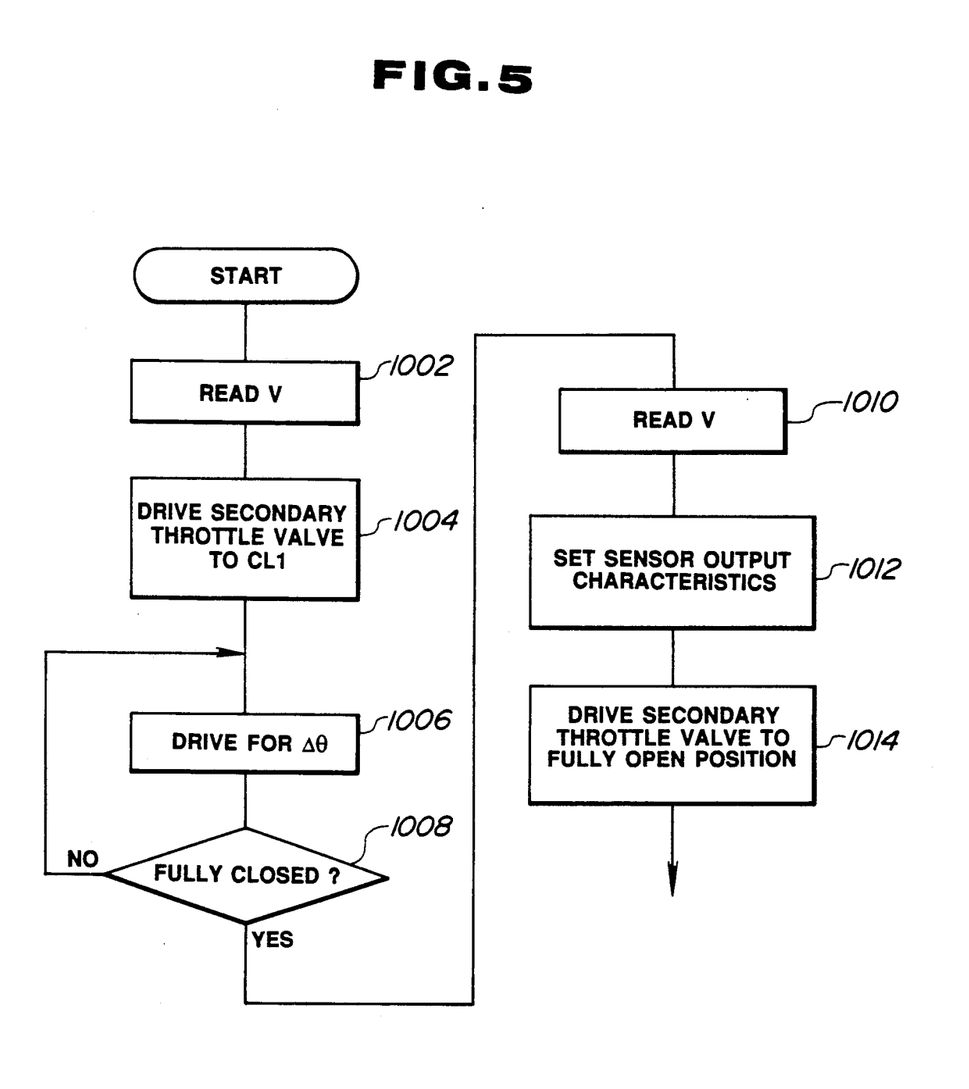
FIG. 5 is a flowchart showing a process for initially setting a secondary throttle fully open angle indicative value and a secondary throttle fully closed open angle indicative value.

The routine shown in FIG. 5 is a initializing stage of a traction control program. The process following to the shown initializing stage may be formulated in various ways known in the art. Therefore, in order to avoid unnecessary volume of discussion which may cause confusion or misunderstanding of the invention, the process in practical traction control will not be discussed herebelow. However, for the sake of disclosure, reference may be had to the following prior publications:

U.S. Pat. No. 4,640,395, issued on Feb. 3, 1987
U.S. Pat. No. 4,625,697, issued on Dec. 2, 1986
U.S. Pat. No. 4,721,683, issued on Jan. 26, 1988
U.S. Pat. No. 4,763,912, issued on Aug. 16, 1988

As set forth, the shown initialization stage is triggered in response turning ON of the ignition switch. At a step 1002, the secondary throttle position indicative signal V from the secondary throttle angle sensor 22 is read out. At the ON set of the power supply, the motor actuator 20 is held inoperative and thus the secondary throttle valve 12 is maintained at the initial position by means of the return spring 46. Therefore, the secondary throttle position indicative signal V read at the step 1002 represents the secondary throttle valve fully open position. The read secondary throttle position indicative signal value V is temporarily stored as a fully open position indicative data $V_{open}$. Subsequently, motor driving control signal commanding forward direction drive of the motor actuator 20 and the driving pulse having a pulse width to drive the secondary throttle valve at the angular position where the secondary throttle position indicative signal having a value $CL_1$ is produced, are generated for driving the secondary throttle valve at the angular position corresponding to the secondary throttle position indicative signal value $CL_1$, at a step 1004.

Thereafter, the motor driving direction control signal commanding again forward direction and the driving pulse having a predetermined angular magnitude of $\Delta\theta$ of the secondary throttle valve 12 is output at a step 1006 to drive the secondary throttle valve in the magnitude of $\Delta\theta$. Then, at a step 1008, check is performed whether the secondary throttle valve 12 is in the fully closed position or not. If the answer at the step 1008 is negative, the process returns to the step 1006 to drive the secondary throttle valve for the angular magnitude of $\Delta\theta$. By repeating the steps 1006 and 1008, the secondary throttle valve is driven to the fully closed position. Then, the answer becomes positive. When the answer at the step 1008 becomes positive, the secondary throttle position indicative signal V of the secondary throttle angle sensor 22 is read at a step 1010. The secondary throttle position indicative signal value V read at the step 1010 is then temporarily stored as the secondary throttle fully closed position representative data $V_{close}$.

At a step 1012, the secondary throttle fully open position indicative data $V_{open}$ and the secondary throttle fully closed position indicative data $V_{close}$ are read out. On the basis of the read data $V_{open}$ and $V_{close}$, the sensor output characteristics are derived at the step 1012. The derived sensor output characteristics are then set for use throughout the period in which the engine is maintained in operation. Thereafter, at a step 1014, the motor driving direction control signal commanding the reverse drive of the motor actuator 20 and the driving pulse in a magnitude for shifting the angular position of the secondary throttle valve to the initial fully open position is output to place the secondary throttle valve at the fully open position.

Figure 6:
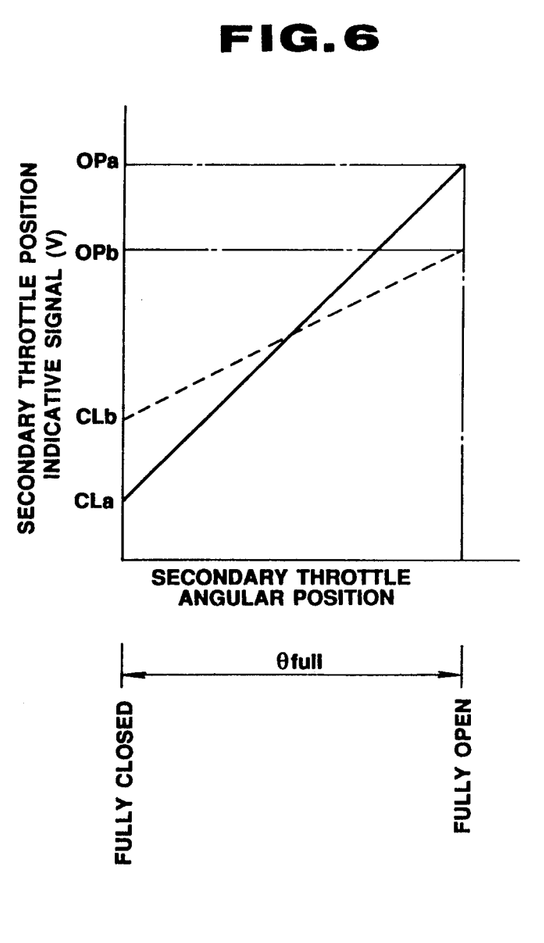
FIG. 6 is a graph showing characteristics of the secondary throttle valve open angle variation.

As shown in FIG. 6, when the designed sensor output characteristics are as illustrated by a solid line $CL_a-OP_a$ and the angular range over which the angular position of the secondary throttle valve is $\theta_{full}$, the gradient of sensor output variation can be illustrated by:

$$(OP_a - CL_a)/\theta_{full}$$

On the other hand, assuming the actual sensor output characteristics are defined by the secondary throttle fully open position data $CL_b$ and the secondary throttle fully closed position data $OP_b$, the actual sensor output characteristics can be derived based on the secondary throttle fully open position data $OP_b$ and the gradient derived from:

$$(OP_b - CL_b)/\theta_{full}$$

Therefore, in the step 1012, arithmetic operation is performed for arithmetically deriving the sensor output characteristics for deriving the secondary throttle valve angular position data based on the secondary throttle position indicative signal of the secondary throttle angle sensor 22.

Figure 7:
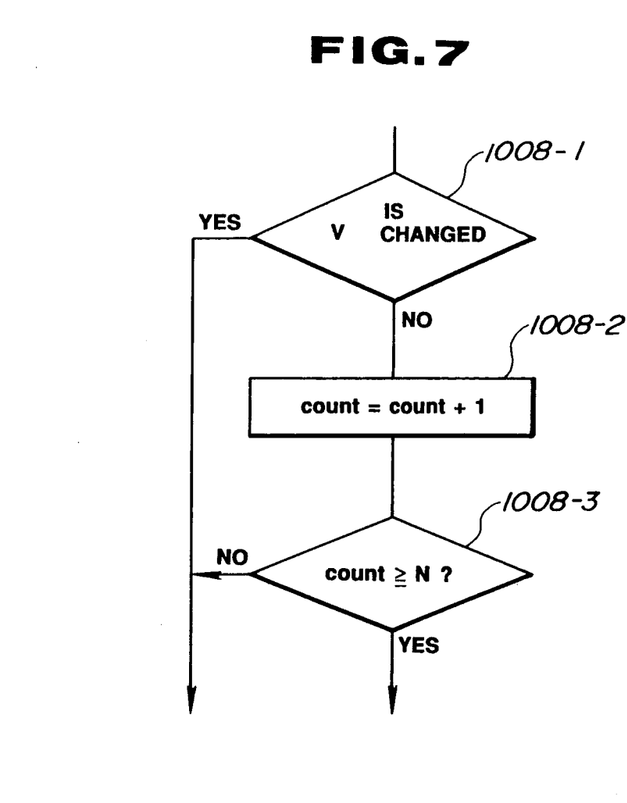
FIG. 7 is a flowchart showing process of detection of the secondary throttle valve fully closed position.

FIG. 7 shows a process of sub-routine for making judgement whether the secondary throttle valve is in the fully closed position, at the step 1008 of FIG. 5. In the shown process, the secondary throttle position indicative signal of the secondary throttle angle sensor 22 is read out at a step 1008-1. At this step 1008-1, the secondary throttle position indicative signal value read in the current execution cycle is compared with the previously read value which is read in the immediately preceding execution cycle. If the values compared in the step 1008-1 are not equal to each other, judgement can be made that the secondary throttle valve is not in the fully closed position. Therefore, the answer at the step 1008 of FIG. 5 becomes negative. On the other hand, when the values compared in the step 1008-1 are equal to each other, then an elapsed time counter value COUNT is incremented by one (1) at a step 1008-2. The elapsed time counter value COUNT is then compared with a preset value N which represents an elapsed time criterion to make judgement that the secondary throttle valve is in the fully closed position at a step 1008-3. If the elapsed time counter value COUNT is smaller than the preset value N as checked at the step 1008-3, then the answer at the step 1008 of FIG. 5 is maintained negative. When the elapsed time counter value COUNT becomes greater than or equal to the preset value N and thus the answer at the step 1008-3 becomes position, the answer at the step 1008 becomes positive.

Figure 8:
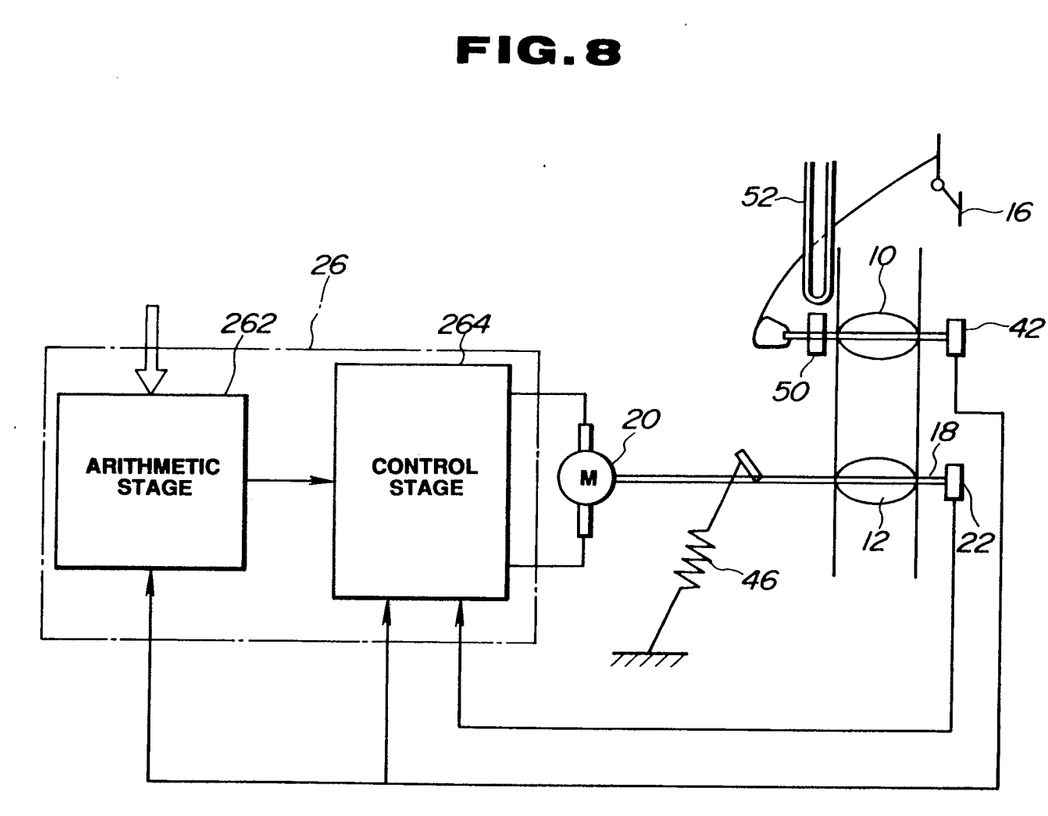
FIG. 8 is a diagrammatical illustration of the second embodiment of the throttle control system according to the present invention.

FIG. 8 shows the second embodiment of the throttle control system according to the present invention. The shown embodiment is differentiated from the former embodiment of FIG. 2 only by the presence of a primary throttle angle adjusting arrangement 50. The common elements or components to the former embodiment will be represented by the same reference numerals to the former embodiment and thus neglected the detailed discussion in order to avoid redundant recitation.

The primary throttle valve angle adjusting arrangement 50 is designed for adjusting the primary throttle valve minimum open angle at a primary throttle valve fully closed position depending upon the engine coolant temperature. Therefore, the primary throttle valve angle adjusting arrangement 50 may include a stopper member (not shown) defining the fully closed position of the primary throttle valve 10. The stopper member is variable of orientation. An engine coolant temperature dependent actuator which may comprise an actuator including a wax or the like which is variable of volume depending upon the temperature condition of the engine coolant, is associated with the stopper member for causing shifting of the latter. By this, the stopper member can be placed at different positions depending upon the engine coolant temperature. In order to implement the engine coolant temperature dependent shifting of the stopper member, an engine coolant passage 52 is defined in the vicinity of the actuator so that the actuator becomes sensitive of the engine coolant temperature to cause shifting of the stopper member.

Figure 9:
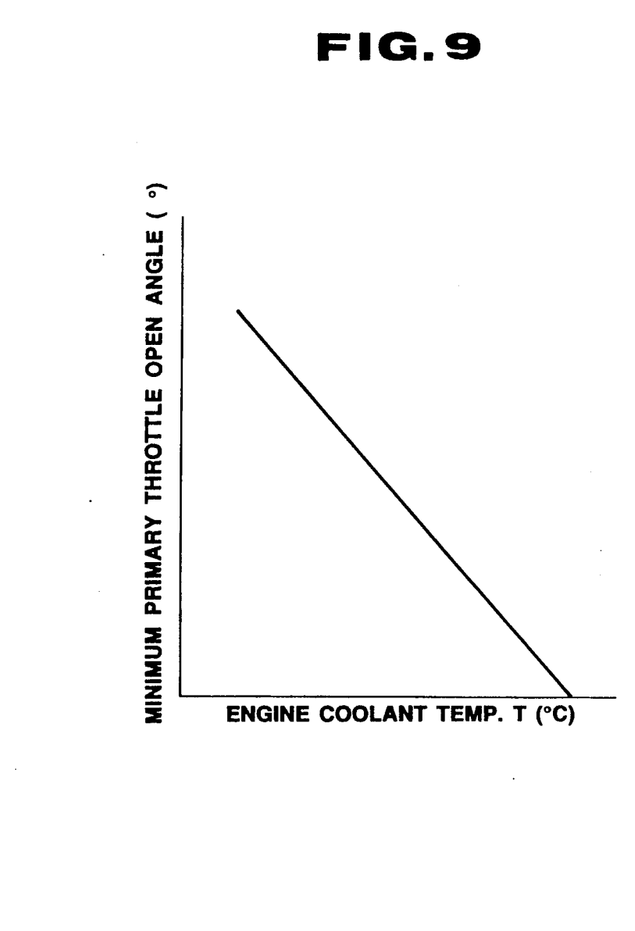
FIG. 9 is a graph showing variation of the open angle of a primary throttle valve at fully closed position in relation to an engine coolant temperature.

FIG. 9 shows variation characteristics of the shifting magnitude of the stopper member in relation to the engine coolant temperature. Namely, when the engine coolant temperature is lower, the shifting magnitude of the stopper member becomes greater for providing greater open angle at the fully closed position, as shown.

In the shown embodiment, the secondary throttle valve 12 open angle at the fully closed position is controlled so that it may not be smaller than the minimum open angle of the primary throttle valve at the fully closed position which is defined by the position of the stopper member as set forth above. The minimum open angle control for the secondary throttle valve 12 can be performed by setting the secondary throttle valve control signal to have a value corresponding to the value of the primary throttle position indicative signal output from the primary throttle angle sensor 42, as long as the primary throttle valve 10 is held at fully closed position.

However, when the primary throttle valve 10 is operated to the angular position other than fully closed position by depression of the accelerator pedal 16, the secondary throttle valve open angle control depending upon the primary throttle position indicative signal becomes impossible. Therefore, in such case, another strategy is taken for controlling the secondary throttle valve open angle at the fully closed position with taking assumption or projection of the minimum open angle of the primary throttle valve 10.

Figure 10:
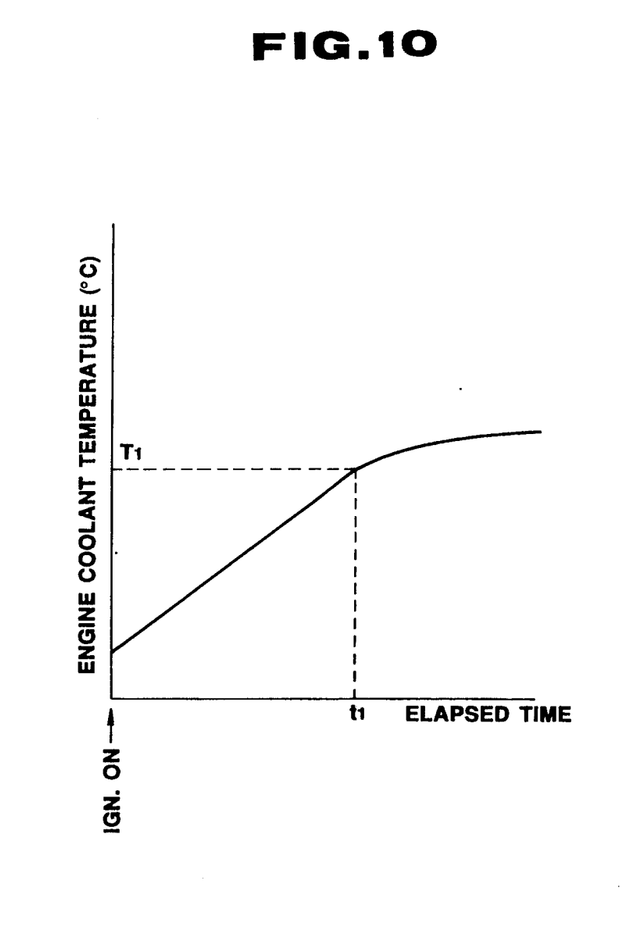
FIG. 10 a graph showing variation of the engine coolant temperature in relation to an elapsed time from starting-up.

In order to enable this, engine coolant temperature variation characteristics during the engine warming up state as illustrated in FIG. 10 are taken into account. As can be seen from FIG. 10, during the engine warming up state, the relationship between the engine coolant temperature T and an elapsed time t from starting-up of the engine or after cranking is substantially linearly proportional to each other. Therefore, the minimum open angle of the secondary throttle valve 12 at the fully closed position can be determined utilizing the characteristics of FIGS. 9 and 10.

Figure 11:
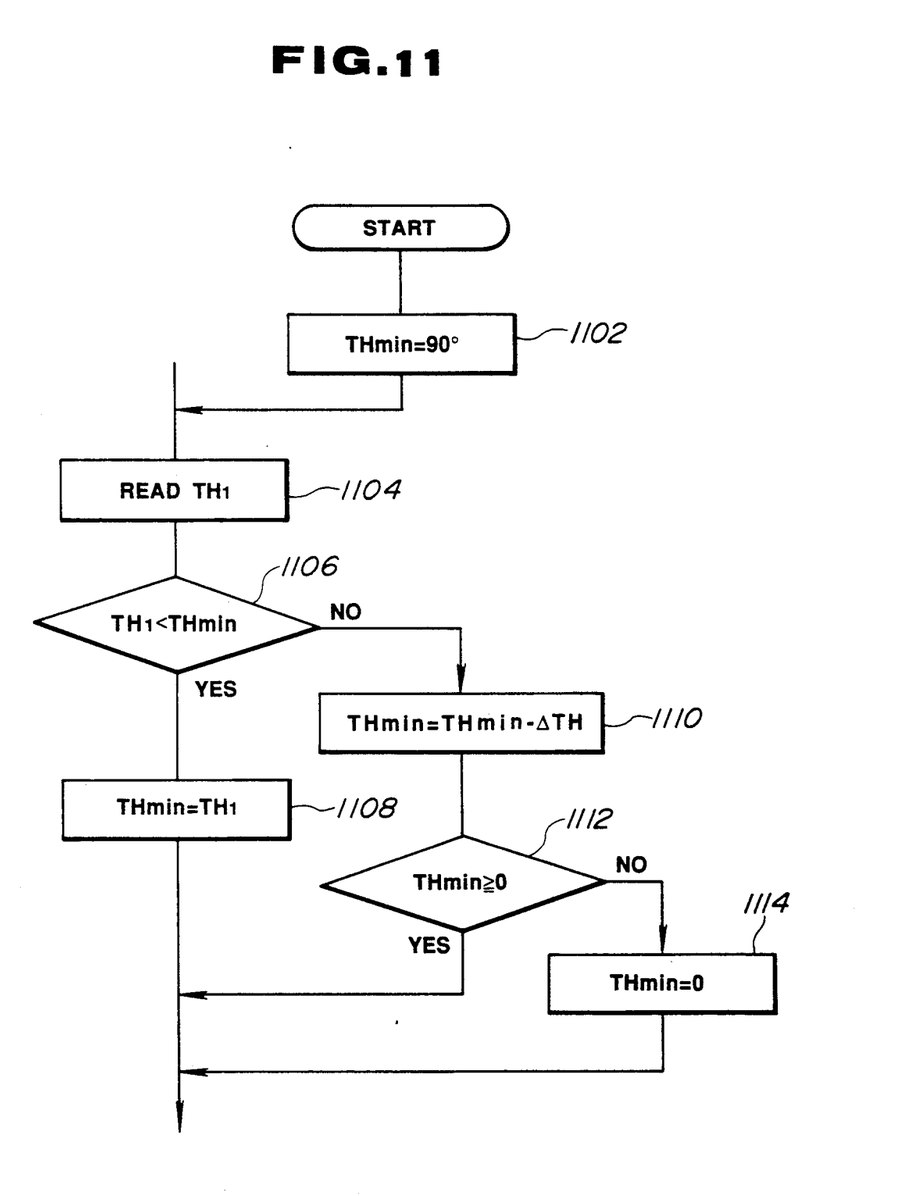
FIG. 11 is a flowchart for deriving the engine coolant temperature dependent open angle at the fully closed position of the primary throttle valve.

In order to practically implement the strategy as set forth above, the process illustrated in FIG. 11 is practically performed in the shown embodiment. The shown process is triggered by turning ON of the ignition switch. Immediately after turning ON the ignition switch. Initially, at a step 1102, the minimum open angle $TH_{min}$ of the secondary throttle valve at the fully closed position is set at 90° immediately after turning ON the ignition switch. Then, at a step 1104, the primary throttle position indicative signal $TH_1$ is read out. The read primary throttle position indicative signal $TH_1$ is compared with the set secondary throttle valve minimum open angle $TH_{min}$ at a step 1106. If the primary throttle position indicative signal value $TH_1$ is smaller than the secondary throttle valve minimum open angle $TH_{min}$ as checked at the step 1106, then the primary throttle valve open angle $TH_1$ is set as the secondary throttle valve minimum open angle at a step 1108.

On the other hand, if the primary throttle position indicative signal value $TH_1$ is greater than or equal to the secondary throttle valve minimum open angle $TH_{min}$ as checked at the step 1106, then the secondary throttle valve minimum open angle $TH_{min}$ is decreased by a predetermined secondary throttle valve open angle reduction value $\Delta TH$ at a step 1110. Thereafter, a check is performed whether the secondary throttle valve minimum open angle $TH_{min}$ derived at the step 1110 is smaller than zero (0), at a step 1112. If the minimum open angle $TH_{min}$ is smaller than zero as checked at the step 1112, then the minimum open angle is modified to zero (0) at a step 1114.

As will be appreciated, this process may introduce a temperature dependent factor in determining the secondary throttle valve minimum open angle at the fully closed position so that engine stalling may not occur even at the cold engine condition.

Though the shown embodiment utilizes wax or the like for adjusting the minimum open angle of the primary throttle valve at the fully closed position, it may be possible to use an electrically controlled actuator for shifting the stopper member at the desired position dependent upon the engine coolant temperature as monitored by a known engine coolant temperature sensor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A method of calibration of a throttle angle sensor installed to detect an opening degree of a second throttle valve disposed within an air induction passage of an engine in series with a first throttle valve disposed therein, the first throttle valve opening in degrees by a manually operable accelerator, the second throttle valve opening in degrees by a motor, the engine being operable to start upon turning an ignition key, the throttle angle sensor generating a sensor output variable in a predetermined pattern with variation in opening degree of the second throttle valve, the second throttle valve being resiliently biased to a first angular position providing the maximum opening degree of the second throttle valve, the method comprising the steps of:

placing the second throttle valve at the first angular position;

storing as a first reference value corresponding to the maximum opening degree of the second throttle valve a sensor output of the throttle angle sensor when the second throttle valve is at the first angular position;

moving the second throttle valve to a second angular position providing the minimum opening degree of the second throttle valve;

storing as a second reference value corresponding to the minimum opening degree of the second throttle valve a sensor output of the throttle angle sensor when the second throttle valve is at the second angular position;

determining a correction factor based on the first and second reference values and the predetermined pattern; and executing all of the preceding steps once after turning the ignition key to a predetermined position.

* * * * *